(12) United States Patent  (10) Patent No.: US 6,738,575 B2
Kanayama  (45) Date of Patent: May 18, 2004

(54) LENS INFORMATION DISPLAY APPARATUS (75) Inventor: Atsushi Kanayama, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/245,295

(22) Filed: Sep. 18, 2002

(65) Prior Publication Data

US 2003/0053805 A1 Mar. 20, 2003

(30) Foreign Application Priority Data

Sep. 20, 2001 (JP) ....................................... 2001-286769

(51) Int. Cl.⁷ ............................................... G03B 17/18
(52) U.S. Cl. ....................... 396/147; 396/374; 396/544; 352/140; 348/333.02; 348/333.07
(58) Field of Search ................................ 396/147, 374, 396/544; 352/140; 348/333.02, 333.06, 333.07

(56) References Cited

U.S. PATENT DOCUMENTS

2003/0025802 A1 * 2/2003 Mayer, Jr. et al. ...... 348/211.99

* cited by examiner

*Primary Examiner*—David M. Gray
(74) *Attorney, Agent, or Firm*—Harness, Dickey & Pierce, P.L.C.

(57) ABSTRACT

The lens information display apparatus is provided that allows the cameraman to check required lens information while looking at a viewfinder. A transmissive LCD panel is mounted in front of a screen of the viewfinder, and a control unit for controlling the image displayed on the LCD panel is attached to the bottom surface of the viewfinder. The control unit obtains lens information from a lens apparatus of a television camera system and causes the LCD panel to display images (characters and/or graphics) representing the lens information so that the lens information is displayed as superimposed on the image on the viewfinder.

6 Claims, 8 Drawing Sheets

LENS INFORMATION DISPLAY APPARATUS

BACKGROUND OF THE INVENTION

1. Field of the Invention

The present invention relates to a lens information display apparatus and, more particularly, to a lens information display apparatus that displays lens information as being superimposed on an image being taken on a viewfinder of a television camera system.

2. Description of the Related Art

In general, known lens apparatuses used with television camera systems for broadcasting include box-shaped EFP lenses primarily used in studios, or portable ENG lenses primarily used in the field and the like. For an EFP lens, lens information such as the position of a zoom lens (zoom position), the position of a focus lens (focus position), or the position of an aperture (F-number) is indicated on indicators on the side of the cover of the lens apparatus, and for an ENG lens, such information is indicated with scales marked on operation rings.

A television camera system typically uses a small monitor called a viewfinder for a cameraman to see an image being taken. The viewfinder is connected to a camera body, and a real-time image outputted from the camera body is displayed on the screen of the viewfinder so that the cameraman can check the image currently being taken by the camera.

Conventionally, cameramen have had such a problem in shooting that, since they typically carry out lens manipulations such as zooming or focusing while checking an image on the viewfinder, they have difficulty in manipulating the lens in parallel with checking both lens information indicated on the indicator or the like and the image on the viewfinder.

SUMMARY OF THE INVENTION

The invention is made in view of such a situation, and has an object of providing a lens information display apparatus that allows a cameraman to see desired lens information on a viewfinder.

To attain the object, the present invention is directed to a lens information display apparatus which displays predetermined lens information for use in a camera system, the camera system comprising a lens apparatus having a taking lens which focuses light from a subject, a camera body which picks up the subject light focused by the taking lens to convert the subject light to image signals, and a viewfinder which displays an image taken by the camera body, the lens information display apparatus comprising: a lens information obtaining device which obtains predetermined lens information from the lens apparatus; and a lens information display device which displays the lens information obtained by the lens information obtaining device as superimposed on the image displayed on the viewfinder.

Preferably, the lens information display device comprises a transmissive display panel which allows light to pass, the display panel positioned in front of an image display screen of the viewfinder; and the lens information is superimposed on the image displayed on the image display screen of the viewfinder by displaying the lens information on the display panel.

Preferably, the display panel is detachable from the viewfinder.

According to the present invention, since lens information is displayed as superimposed on the image displayed on the viewfinder, the cameraman can check lens information while looking at the image displayed on the viewfinder.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

In the following, preferred embodiments of the lens information display apparatus according to the present invention will be described in detail in conjunction with the accompanying drawings.

Figure 1:
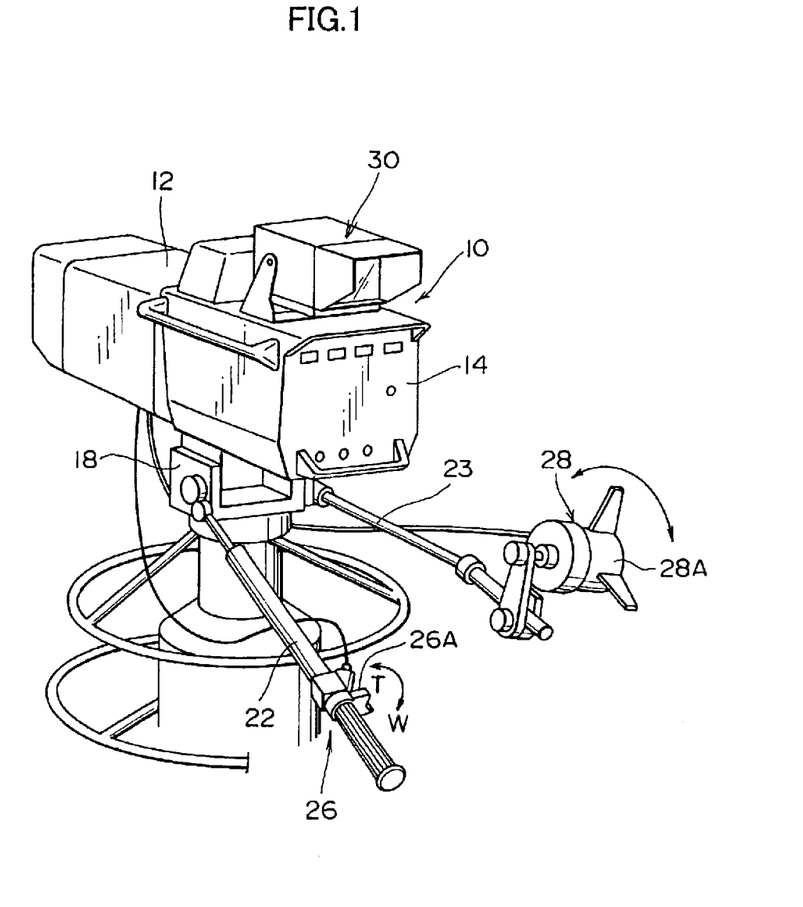
FIG. 1 is a perspective view of the general structure of a television camera system to which the invention is applied.

FIG. 1 is a perspective view of the general structure of a television camera system to which an embodiment of the present invention is applied. The television camera system 10 comprises a zoom lens apparatus 12 (hereafter simply referred to as lens apparatus 12) and a camera body 14. The lens apparatus 12 is attached to the front side of the camera body 14 set on a pan head 18.

A zoom rate demand 26 and a focus position demand 28 are attached to the ends of panning/tilting sticks 22 and 23 extending from the pan head 18. When a thumb ring 26A of the zoom rate demand 26 is rotated, a zooming rate designation signal that instructs a movement with a zooming rate corresponding to the rotation position is provided to the lens apparatus 12, causing the zoom lens of the lens apparatus 12 to move driven by a motor with the zoom rate specified by the signal. When a focus ring 28A of the focus position demand 28 is rotated, a focus position designation signal that instructs a movement to a focus position corresponding to the rotation position is provided to the lens apparatus 12, causing a focus lens in the lens apparatus 12 to move driven by a motor to the focus position specified by the signal.

A viewfinder or a monitor 30 is mounted on the upper surface of the camera body 14, and the viewfinder 30 displays on its screen a real-time image that is being imaged by the pick-up devices of the camera body 14 through the taking lens of the lens apparatus 12. The cameraman can perform various lens manipulations such as zooming and focusing while looking at the image on the viewfinder 30. The image displayed on the viewfinder 30 will not necessarily be a real-time image.

A transmissive liquid crystal display (LCD) panel to be described later is attached in front of the display screen of the viewfinder 30, and the LCD panel displays lens information (current zoom position, focus position, etc.) outputted from the lens apparatus 12 as superimposed on the image displayed on the viewfinder 30. Thus, the cameraman can check the details of lens information while looking into the viewfinder 30.

Figure 2:
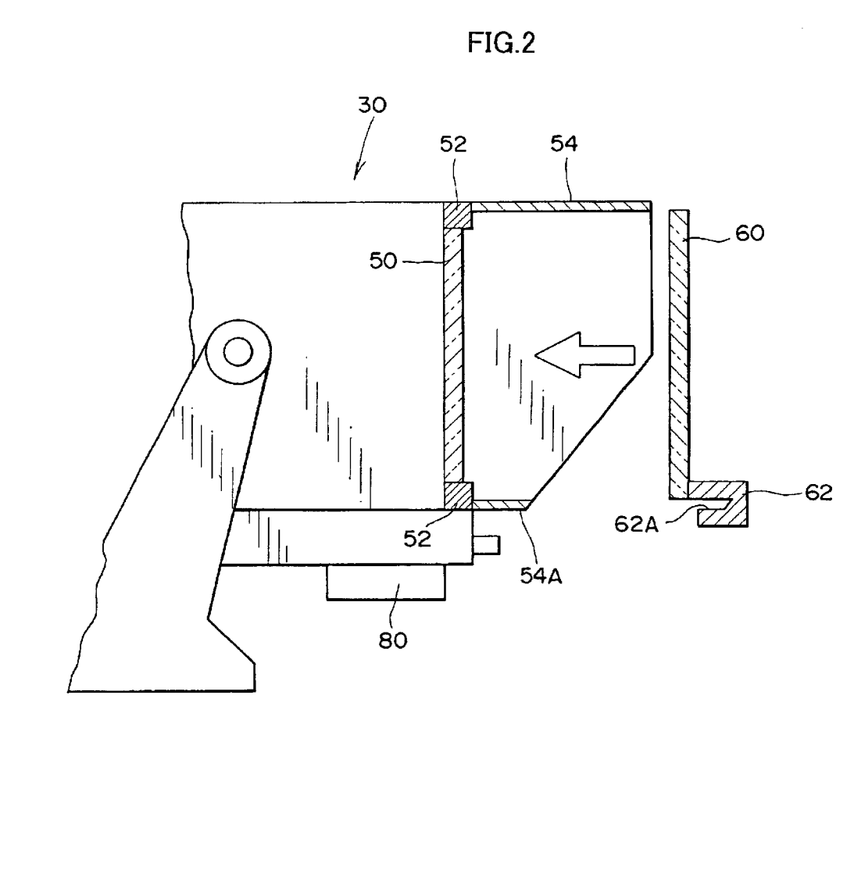
FIG. 2 is a side view of some members disposed in front of a viewfinder.

FIG. 2 shows a side view of some members disposed in front of the viewfinder 30. As shown, a face plate glass 50 of a cathode ray tube is disposed in front (on the screen) of the viewfinder 30, a frame 52 is disposed around the glass 50, and a hood 54 surrounding the four sides of the screen is attached to the frame 52.

A detachable transmissive LCD panel 60 for showing lens information can be attached to the front side of the screen of the viewfinder 30. Since the LCD panel 60 is of transmissive type, an image displayed on the screen of the viewfinder 30 passes through the LCD panel 60 as it is except for figures or characters displayed on the LCD panel 60. Accordingly, the cameraman can see an image as if the figures and characters displayed on the LCD panel 60 are superimposed on the image displayed on the viewfinder 30.

Figure 3:
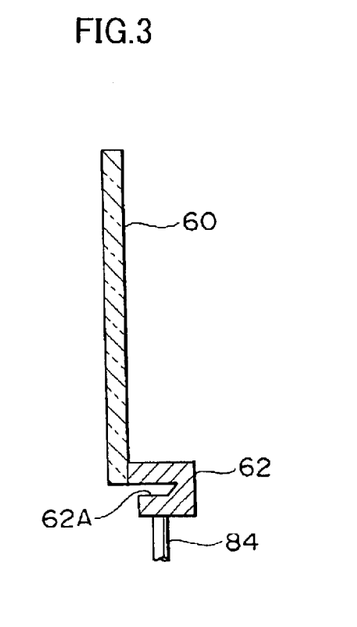
FIG. 3 is a side view of a LCD panel for the unit according to the invention.
Figure 4:
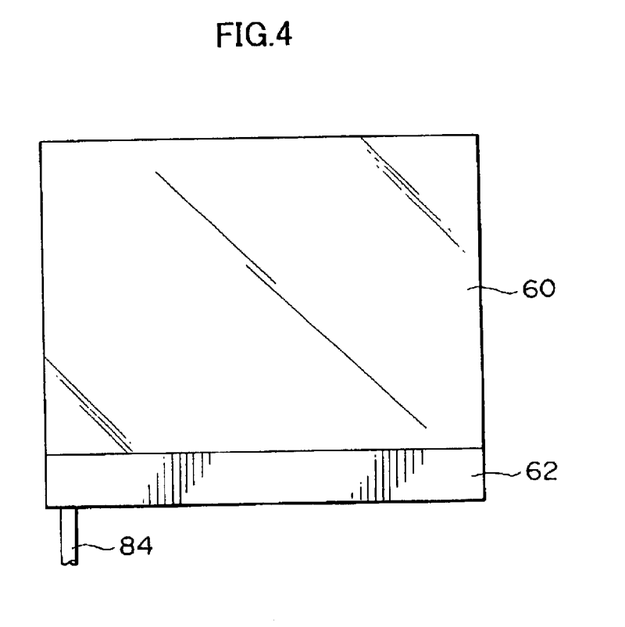
FIG. 4 is a front view of a LCD panel for the unit according to the invention.

The LCD panel 60 has, along its bottom rim, a longitudinal connector 62 having a slit 62A with a U-shaped section. A side view of the LCD panel 60 is shown in FIG. 3 and its front view is shown in FIG. 4. When the LCD panel 60 in FIG. 2 is fit into the hood 54 toward the viewfinder 30, the backside periphery of the LCD panel 60 touches the frame 52 and edge surfaces on the four sides of the LCD panel 60 fit against the interior surfaces of the hood 54 as shown FIG. 5. A flange 54A at the bottom of the hood 54 also fits into the slit 62A of the connector 62. In addition, as shown in the enlarged view in FIG. 6, a threaded hole 64 is formed in the connector 62 from its upper surface to the slit 62A, and the LCD panel 60 is fixed onto the front of the viewfinder 30 by inserting a screw 66 into the threaded hole 64 and pressing the end of the screw 66 against the flange 54A of the hood 54 fitting into the slit 62A.

Figure 7:
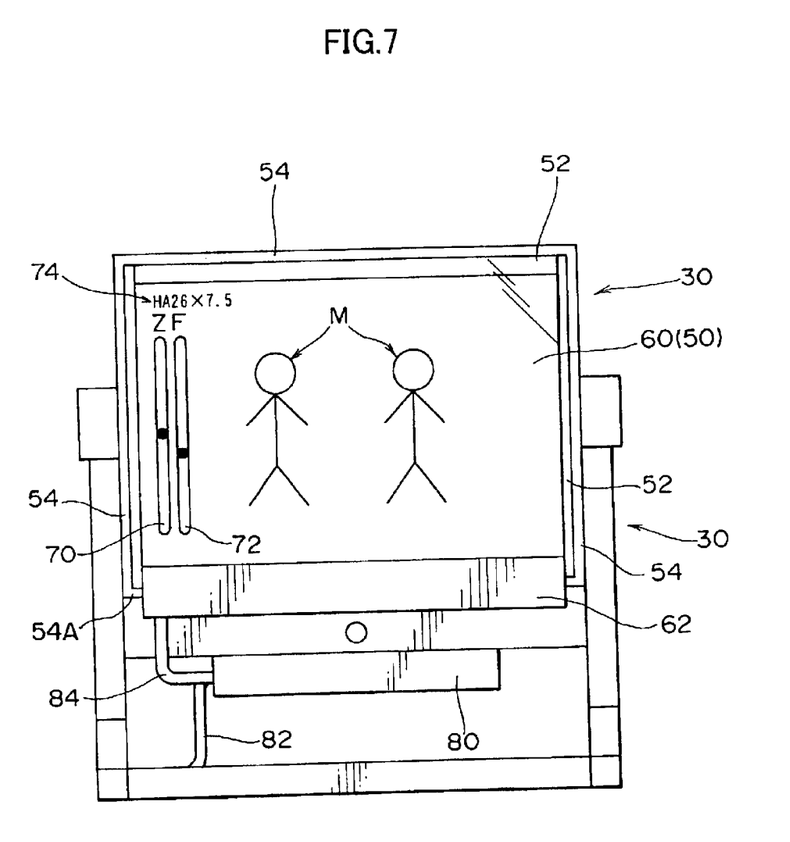
FIG. 7 is a front view illustrating an appearance with the LCD panel for the unit according to the invention being attached to the viewfinder, showing images displayed as lens information.

FIG. 7 shows as a front view how the viewfinder 30 looks when the LCD panel 60 is attached to the front of the viewfinder 30. In the figure, human figures M are images that are displayed on the screen of the viewfinder 30, and the graphics 70 and 72 at the left-hand side on the screen are images that are displayed on the LCD panel 60 as lens information. The graphic 70 indicates the zoom position, and the graphic 72 indicates the focus position. The longitudinal frames of the graphics 70 and 72 indicate possible range of zoom position and focus position, and each black point shows each current position. The characters 74 on upper left are images displayed on the LCD panel 60 as lens information, indicating the model of the lens apparatus 12.

Figure 5:
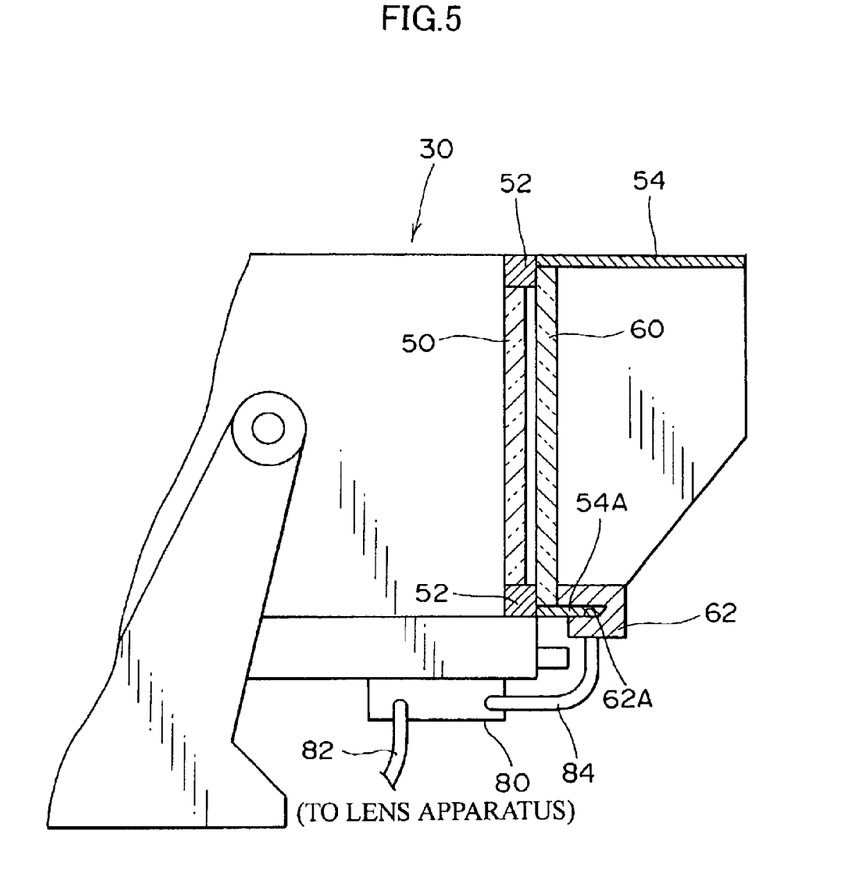
FIG. 5 is a side view illustrating the LCD panel for the unit according to the invention being attached to the viewfinder.
Figure 6:
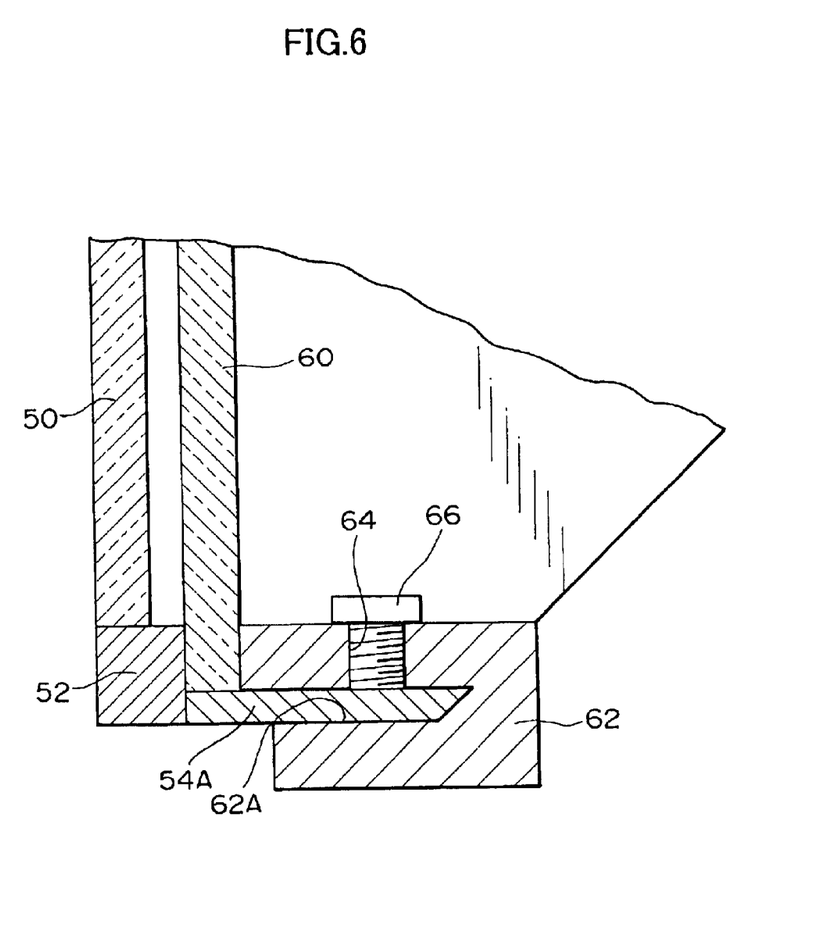
FIG. 6 is an enlarged view of substantial parts with the LCD panel for the unit according to the invention being attached to the viewfinder with a screw.

As shown in FIGS. 5 and 7, a control unit 80 for controlling images displayed on the LCD panel 60 is attached to the bottom surface of the viewfinder 30 with screws or the like. The control unit 80 may be attached to any desired positions other than the bottom surface of the viewfinder 30.

The control unit 80 is connected to the lens apparatus 12 by a cable 82, and can get required lens information from the lens apparatus 12 through communication (serial communication) with the lens apparatus 12. The control unit 80 is also connected to the connector 62 of the LCD panel 60 by a cable 84, such that drive signals for the LCD panel 60 (i.e., voltage signals to be applied to pixel electrodes of the LCD panel 60) outputted by the control unit 80 are sent to the connector 62 and the signals are supplied to the LCD panel 60 through signal lines (not shown) wired inside the connector 62.

In the control unit 80, lens information is converted to image data for displaying it as images on the LCD panel 60 according to the lens information obtained from the lens apparatus 12, and the drive signals for displaying the images on the LCD panel 60 are outputted to the LCD panel 60 as described. As a result, the images representing the lens information are displayed on the LCD panel 60 as described earlier.

Figure 8:
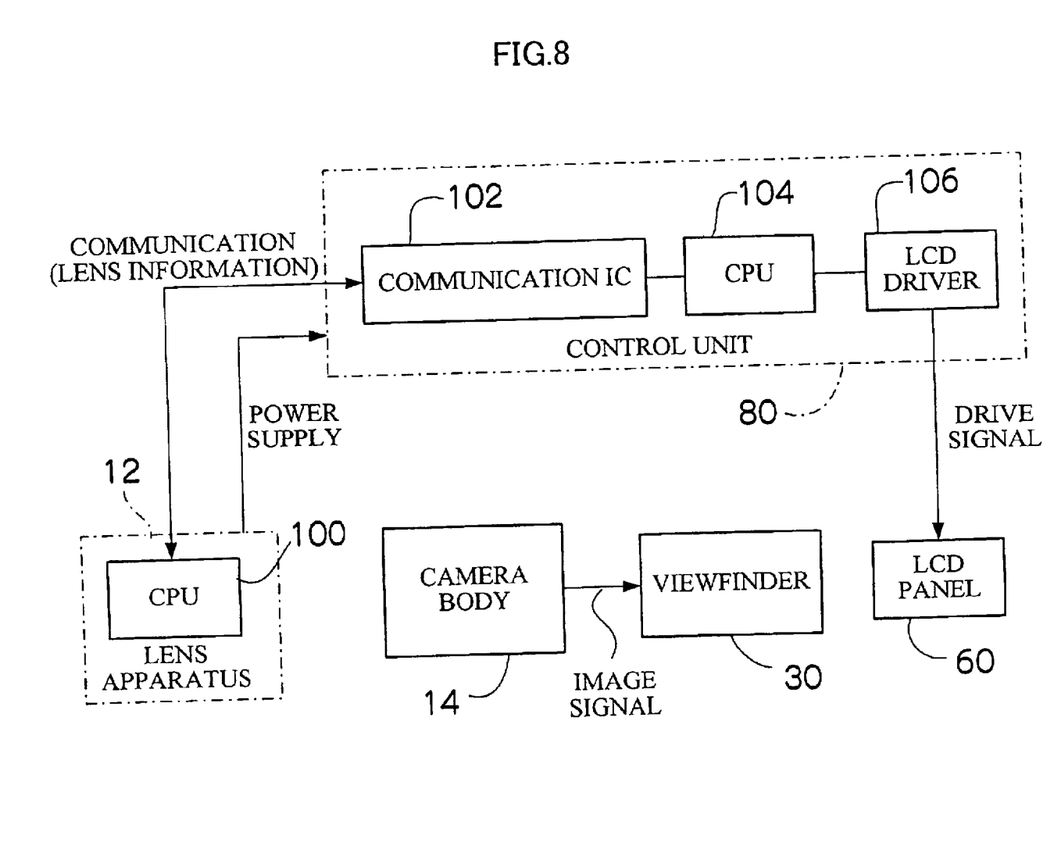
FIG. 8 shows control blocks for displaying required lens information on the LCD panel.

Control blocks for displaying required lens information on the LCD panel 60 are shown in FIG. 8. As shown, the viewfinder 30 is connected to a predetermined image output terminal of the camera body 14 such that an image taken by the camera body 14 through the taking lens of lens apparatus 12 is displayed on the screen of the viewfinder 30 in real time.

The lens apparatus 12 is configured such that set positions of the zoom lens, the focus lens and the aperture in the taking lens can be operated through a lens driving mechanism (not shown), and a CPU 100 inside the lens apparatus 12 can obtain their set positions (zoom position, focus position, and aperture position (F-number) etc.) as lens information through a potentiometer or the like for each part. The CPU 100 can also obtain any of additional lens information (e.g., the model of the lens apparatus 12) to be displayed on the LCD panel 60 from a memory or the like.

The control unit 80 for the LCD panel 60 is connected to a certain connector of the lens apparatus 12 through a cable such that the control unit 80 can perform serial communication with the CPU 100 of the lens apparatus 12 to obtain required lens information from the CPU 100. Power required by the control unit 80 is supplied from the lens apparatus 12. The communication control at the control unit 80 is made mainly by a communication IC 102, and lens information obtained by the communication IC 102 is provided to a CPU 104 of the control unit 80. The CPU 104 generates image data for displaying the lens information as images based on the lens information received from the lens apparatus 12. The CPU 104 then sends driving signal for displaying the images based on the image data on the LCD panel to the LCD panel 60 located in front of the screen of the viewfinder 30 through an LCD driver 106. As a result, desired lens information is displayed on the LCD panel 60.

Figure 9:
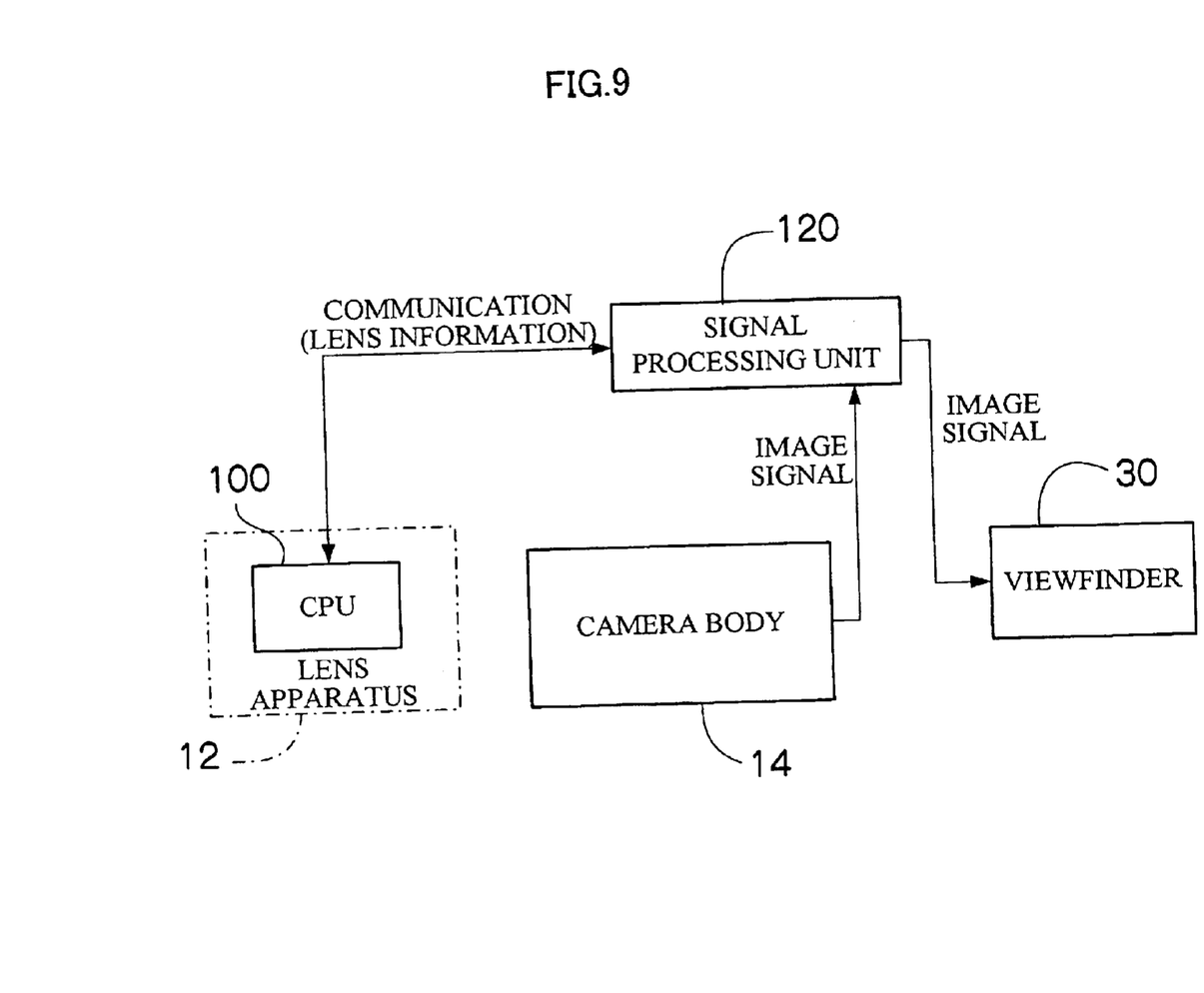
FIG. 9 shows control blocks for another embodiment of the unit according to the invention.

Although the above-described embodiment displays lens information as superimposed on an image shown on the screen of the viewfinder 30 by displaying lens information on the transmissive LCD panel 60 located in front of the screen of the viewfinder 30, it is also possible to superimpose lens information directly on an image displayed on the screen of the viewfinder 30. For example, image signals from the camera body 14 that are outputted to the viewfinder 30 in the above description will be inputted to a signal processing unit 120 as shown in FIG. 9. The signal processing unit 120 may be located at a desired position similarly to the control unit 80. The signal processing unit 120 obtains required lens information from the lens apparatus 12 and generates image signals for displaying the lens information as images like the control unit 80. More specifically, the signal processing unit 120 generates image signals by superimposing image signals for the lens information on the image signals obtained from the viewfinder 30, and outputs the generated image signals to the viewfinder 30. As a result, lens information becomes displayed on the screen of viewfinder 30 together with an image being taken or the like.

Although in the above-described embodiments, the zoom position, the focus position and the model of lens apparatus 12 are displayed as lens information as shown in FIG. 7, desired information other than these may be displayed as well. The LCD panel 60 may be replaced with any other display devices of transmissive type.

As has been described, with the lens information display apparatus according to the present invention, the cameraman can check lens information as well while looking at an image displayed on the viewfinder, since the lens information is displayed as superimposed on the image displayed on the viewfinder.

The device according to the present invention can be manufactured as a separate device from the camera body; in that case, the present invention may be put into practical use at a lower cost than the case where lens information is displayed on the viewfinder through the camera body, since an existing camera can be used for the camera body without modification.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens information display apparatus which displays the lens information for use in a camera system, the camera system comprising:

a lens apparatus having a taking lens which focuses light from a subject, a camera body which picks up the subject light focused by the taking lens to convert the subject light to image signals, and a viewfinder which displays an image taken by the camera body, the lens information display apparatus comprising:
a lens information obtaining device which obtains the lens information from the lens apparatus; and
a lens information display device which displays the lens information obtained by the lens information obtaining device superimposed on the image displayed on the viewfinder, wherein:
the lens information display device comprises a transmissive display panel which allows light to pass, the display panel positioned in front of an image display screen of the viewfinder; and
the lens information is superimposed on the image displayed on the image display screen of the viewfinder by displaying the lens information on the display panel.

2. The lens information display apparatus according to claim 1, wherein the display panel is detachable from the viewfinder.

3. A lens information display apparatus comprising:

a lens information obtaining device which obtains lens information from a lens apparatus; and
a lens information display device which displays the lens information obtained by the lens information obtaining device superimposed on the image displayed on a viewfinder,
wherein the lens information display device includes a transmissive display panel which allows light to pass the display panel positioned in front of an image display screen of the viewfinder.

4. The lens information display apparatus according to claim 3, wherein the display panel is detachable from the viewfinder.

5. A lens information display apparatus which displays predetermined lens information for use in a camera system, the camera system comprising a lens apparatus having a taking lens which focuses light from a subject, a camera body which picks up the subject light focused by the taking lens to convert the subject tight to image signals, and a viewfinder which displays an image taken by the camera body, the lens information display apparatus comprising:

a lens information obtaining means for obtaining a predetermined lens information from the lens apparatus; and
a lens information display means for allowing the simultaneous display of the lens information obtained by the lens information obtaining means as superimposed on the image displayed on the viewfinder.

6. The lens information display apparatus according to claim 5, wherein the display panel means is detachable from the viewfinder.

* * * * *